Patented Nov. 6, 1928.

1,690,236

UNITED STATES PATENT OFFICE.

WALTER MIEG, OF VOHWINKEL, GERMANY, ASSIGNOR TO GRASSELLI DYESTUFF CORPORATION, OF NEW YORK, N. Y., A CORPORATION OF DELAWARE.

ANTHRAQUINONE VAT DYESTUFF.

No Drawing. Application filed January 20, 1926, Serial No. 82,588, and in Germany January 21, 1925.

This invention relates to the preparation of vat dyestuffs of the anthraquinone series by submitting certain anthraquinone derivatives to an aluminum chloride fusion in the presence of a cyclic compound containing a tertiary nitrogen atom, i. e., a nitrogen atom having three valence bonds attached to carbon, and to certain new products prepared according to this process.

In several German patents, as for example, 136,015, 240,080, 249,000 and 262,788, the fusion of anthraquinone derivatives with aluminum chloride is described. In these patents, the substances are heated to temperatures of 220 to 270° C. in admixture with a large excess of aluminum chloride (up to 5 parts by weight).

We have found that such fusions can be carried out not only with smaller amounts of aluminum chloride, as for example, with only one part by weight, but also that it can be carried out at considerably lower temperatures if aluminum chloride is used in the presence of cyclic compounds containing a tertiary nitrogen atom such as pyridine, quinoline, dimethylanilin, etc. For example, anhydrous aluminum chloride is mixed with one to four times its weight of dry pyridine, and a very well crystallizing compound of both components, which is soluble in excess pyridine, is obtained with evolution of heat, and then the substance that is to be fused is introduced with stirring. Then it is quickly heated to the reaction temperature which is about 100° C. lower than in the case of the acid aluminum chloride melts. The reaction product is thus obtained partly in the form of a leuco-compound from which it can be easily isolated by treatment with the oxygen of air.

The process just described presents very important advantages over the processes of the patents mentioned. Besides the diminution of the amount of aluminum chloride, the frothing which is very great in the case of the acid melts and which makes the process difficult, is lessened, and most important of all, the present process yields very pure products directly in excellent yields due to the lower reaction temperature and the presence of a base whereby the injurious effects of free hydrochloric acid at high temperatures are avoided. While for example, according to German Patent 240,080, 1.1' dianthraquinonylamine yields a brown vat dyestuff on heating to 220° C. with aluminum chloride which is converted into a crystalline yellow dyestuff only after treatment with sodium hypochlorite at 80° C. according to the process of German Patent 251,021 and with considerable loss of yield, according to Example 1 of the present application, a product is obtained at 120° C. which on contact with the oxygen of air yields the same yellow dyestuff in quantitative yields. Other organic solvents of a non-basic nature cannot be used with the aluminum chloride fusion with the same results. For example, according to German Patent 206,464 a reddish-brown vat dyestuff is obtained by the action of aluminum chloride on 2-aminoanthraquinone with nitrobenzol as a diluent, whereas when pyridine is used in place of nitrobenzene, flavanthrene results at about 180° C. (Example 6). Flavanthrene when prepared by melting 2-aminoanthraquinone with aluminum chloride alone, is obtained only at temperatures of 250 to 280° C. (German Patent 136,015).

The invention is illustrated by the following examples:

*Example 1.*

Ten parts by weight of anhydrous aluminum chloride are mixed with 40 parts by weight of dry pyridine by stirring. Solution results with development of a large amount of heat, and the temperature must eventually be maintained below the boiling point of pyridine by cooling. Then ten parts by weight of 1.1' dianthraquinonylamine are introduced and the mixture is heated for a short time with stirring to a temperature of about 120° C. until everything is dissolved. The olive-colored melt while still warm is stirred into 1000 parts by weight of about 3% caustic soda and in this way a part of the reaction product goes into solution forming an orange vat. Then oxidation is brought about by vigorous stirring in the air at about 70° C. Finally, it is boiled and the precipitated yellow dyestuff is isolated by filtration in very good yields. It possesses the characteristics of the dyestuff of Example 1 of German Patent 251,021, is soluble with extreme difficulty in high boiling organic solvents, yields deep red colored solutions in concentrated sulfuric acid and dyes cotton from vats in fast orange-yellow shades. It probably possesses a carbazole structure corresponding probably to the formula:

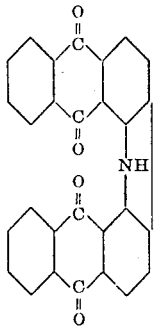

just like the reaction products of aluminum chloride with other dianthraquinonylamines (cf. Cohn, "The carbazole group" page 274 ff).

Other organic bases, as for example, quinoline and dimethylaniline may be used in place of pyridine, and in this case the melts are advantageously first extracted by cooking with dilute hydrochloric acid and the reaction product dissolved in an alkaline hydrosulfite solution vat as in Example 2, and reprecipitated by oxidation.

*Example 2.*

Ten parts by weight of 4-benzoylamine 1.1′ dianthraquinonylamine are suspended in 50 parts by weight of pyridine, 16 parts by weight of anhydrous aluminum chloride are introduced and the mixture is heated for about twenty minutes to 125° C. until a homogenous olive-brown melt results. The mixture is worked up by stirring it into dilute caustic soda which contains the amount of hydrosulfite necessary to reduce the dyestuff formed, and then the reaction product is separated by blowing in air and filtering the vat. The dyestuff is obtained in good yields and is somewhat more easily soluble in organic solvents than the products of Example 1. It yields brown colored solutions in concentrated sulfuric acid. It dyes cotton very fast brown shades from cold and warm vats, and corresponds probably to the formula:

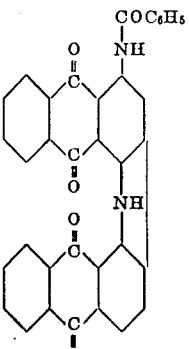

*Example 3.*

A mixture prepared as in Example 1 and consisting of 10 parts by weight of anhydrous aluminum chloride, 10 parts by weight of pyridine and 5 parts by weight of 1.2′ dianthraquinonylamine is heated for a short time to 165–170° C. until a solution of a sample in alkaline hydrosulfite solution yields an orange-yellow precipitate on oxidation with air or a hypochlorite solution. After cooling, the fusion can be worked up as in Example 2. The resulting dyestuff which corresponds probably to the formula:

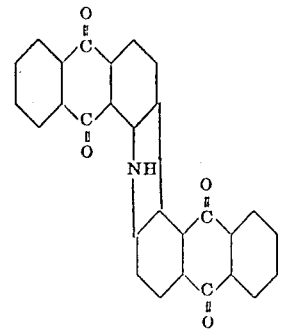

crystallizes from aniline in fine orange needles which yield a cherry-red solution in concentrated sulfuric acid. Cotton is dyed fast orange-yellow shades from brown-red vats. By treating the dyestuff paste with sodium hypochlorite solution even greater clearness of shade can be arrived at.

*Example 4.*

Five parts by weight of the dianthraquinonylamine derivative obtained by condensing 4-brom-1.9 anthraquinone-methylpyridone with 1-aminoanthraquinone are heated in admixture with 12 parts by weight of pyridine and 10 parts by weight of anhydrous aluminum chloride for about 45 minutes at 160–180° C. with stirring. The reaction product is isolated as described above. It dissolves in boiling nitrobenzol only with difficulty and crystallizes from this solution in fine orange needles which yield deep red solutions in concentrated sulfuric acid. It produces fast brownish-orange dyeings on cotton from both cold and warm vats and corresponds probably to the formula:

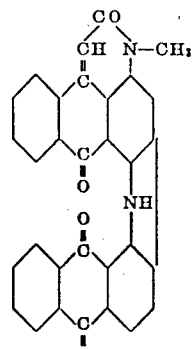

*Example 5.*

Ten parts by weight of 1.1′ dianthraquinonyl-1″.4″-diaminoanthraquinone of the formula:

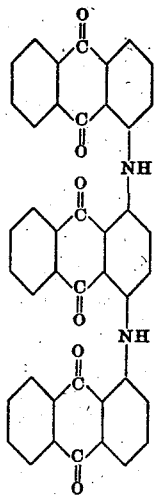

are introduced at about 100° C. into a solution of 20 parts by weight of anhydrous aluminum chloride in 40 parts by weight of pyridine and the temperature is maintained for a short time with stirring at 125–130° C. The melt soon becomes very viscous and can be worked up after cooling as in Example 2 by treatment in an alkaline hydrosulfite vat solution, in which the reaction product dissolves easily yielding a yellow-brown solution. The resulting dyestuff which probably possesses the formula:

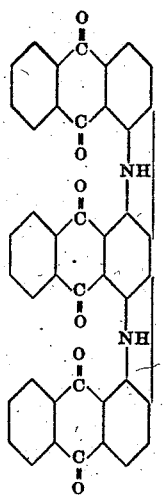

dissolves only with great difficulty in concentrated sulfuric acid producing a bright olive color and is precipitated from this solution in the form of reddish-brown flakes by means of water. These flakes yield very fast and deep reddish-brown dyeings on cotton. It differs essentially from the product of German Patent 208,969, which is obtained by melting the same raw materials with potash, which yields brown solutions in sulfuric acid and a yellow-brown precipitate from such a solution by addition of water, and which dyes cotton tobacco brown shades which are considerably paler. By purifying from sulfuric acid for example, it can be converted into a dyestuff which is identical with the product of this example.

*Example 6.*

Five parts by weight of 2-aminoanthraquinone are stirred into the warm mixture of 10 parts by weight of aluminum chloride and 10 parts by weight of pyridine, and the melt is heated for about 30 minutes to 170–190° C. until it has become viscous. On introducing the melt into a warm alkaline hydrosulfite solution, the resulting flavanthrene which probably possesses the formula:

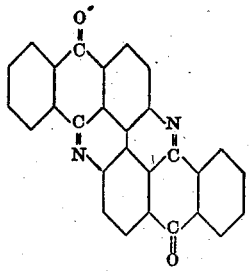

goes into solution with a deep blue color and can then be precipitated in orange flakes by blowing in air, if necessary, after filtering off impurities.

The products produced according to my invention are very superior to products produced by the processes of aluminum chloride fusion heretofore used. The products of Examples 1 and 5 are purer and are obtained in better yields than by the fusion process using aluminum chloride only. All of the dyestuffs described in Examples 1 to 5 belong to the carbazole class and are outstandingly fast.

I claim:

1. Process of producing vat dyestuffs of the anthraquinone series which consists in reacting with anhydrous aluminum chloride upon an anthraquinone derivative corresponding to the general formula:

in which R stands for an anthraquinonyl residue and $R_1$ for hydrogen or an anthraquinonyl residue, in the presence of substantial amounts of a cyclic compound containing a tertiary nitrogen atom different from the anthraquinone derivative reacted upon.

2. Process of producing vat dyestuffs of the anthraquinone series which consists in reacting with anhydrous aluminum chloride upon an anthraquinone derivative corresponding to the general formula:

in which R stands for an anthraquinonyl residue and $R_1$ for hydrogen or an anthraquinonyl residue, in the presence of substantial amounts of a compound containing a pyridine nucleus.

3. Process of producing vat dyestuffs of the anthraquinone series which consists in reacting with anhydrous aluminum chloride upon an anthraquinone derivative corresponding to the general formula:

in which R stands for an anthraquinonyl residue and $R_1$ for hydrogen or an anthraquinonyl residue, in the presence of substantial amounts of pyridine.

4. Process of producing vat dyestuffs of the anthraquinone series which consists in reacting with anhydrous aluminum chloride upon a dianthraquinonylamine in presence of substantial amounts of a cyclic compound containing a tertiary nitrogen atom different from the dianthraquinonylamine reacted upon.

5. Process of producing vat dyestuffs of the anthraquinone series which consists in reacting with anhydrous aluminum chloride upon a dianthraquinonylamine in presence of substantial amounts of a compound containing a pyridine nucleus.

6. Process of producing vat dyestuffs of the anthraquinone series which consists in reacting with anhydrous aluminum chloride upon a dianthraquinonylamine in presence of substantial amounts of pyridine.

7. Process of producing vat dyestuffs of the anthraquinone series which consists in reacting with anhydrous aluminum chloride upon a 1-2'-dianthraquinonylamine in presence of substantial amounts of pyridine.

8. As a new product the vat dyestuff which is obtainable by treating 1-2'-dianthraquinonylamine with anhydrous aluminum chloride in presence of pyridine, which is chemically most likely a carbazol derivative, which is an orange colored crystalline compound, soluble in concentrated sulfuric acid with a cherry color and dyeing cotton orange-yellow fast shades from brown-red vats.

In testimony whereof I have hereunto set my hand.

WALTER MIEG.